United States Patent Office 3,494,913
Patented Feb. 10, 1970

3,494,913
LOWER ALKYL-2-O-(β-CARBOXY-PROPIONYL)-TRISUBSTITUTED-D-GLUCOFURANOSIDES
Alberto Rossi, Oberwil, Basel-Land, Switzerland, assignor to Ciba Corporation, New York, N.Y., a corporation of Delaware
No Drawing. Filed Dec. 28, 1967, Ser. No. 694,043
Claims priority, application Switzerland, Jan. 16, 1967, 564/67; Sept. 25, 1967, 13,372/67
Int. Cl. C07d 5/04; C07g 3/00; A61k 27/00
U.S. Cl. 260—210                  8 Claims

ABSTRACT OF THE DISCLOSURE

Lower alkyl-2-O-(β-carboxypropionyl)-3-O-$R_3$-5-O-$R_5$-6-O-$R_6$-glucofuranosides of the formula

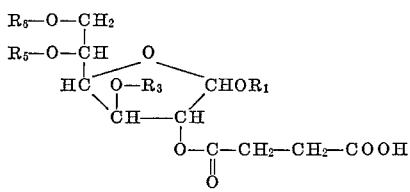

in which $R_1$ stands for lower alkyl and each of $R_3$, $R_5$ and $R_6$ represents optionally substituted benzyl, and their salts have anti-inflammatory properties; the salts, particularly the alkali metal salts are water-soluble.

SUMMARY OF THE INVENTION

The present invention concerns lower alkyl-2-O-(β-carboxypropionyl) - 3-O-$R_3$-5-O-$R_5$-6-O-$R_6$ - glucofuranosides, especially glucofuranosides of the formula

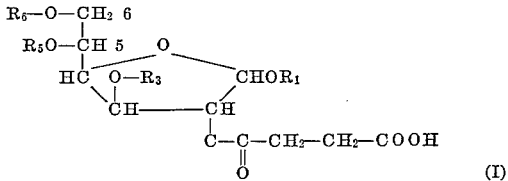

in which $R_1$ represents a lower alkyl, and each of $R_3$, $R_5$ and $R_6$ stands for an optionally substituted benzyl radical and process for their manufacture, as well as pharmaceutical compositions containing such compounds. The new compounds and compositions containing them are useful as antiphlogistic agents.

DESCRIPTION OF THE PREFERRED EMBODIMENTS

Lower alkyl radicals are above all those containing at most 5 carbon atoms, such as propyl, isopropyl, sec. butyl or especially ethyl radicals.

The aromatic nucleus of the benzyl radicals may carry substituents, particularly lower alkoxy, e.g. methoxy, ethoxy or propoxy groups, as well as methylenedioxy groups, halogen atoms, e.g. chlorine or bromine atoms, lower alkyl, e.g. methyl, ethyl, propyl or butyl groups, and/or trifluoromethyl groups.

The new compounds possess valuable pharmacological properties. More particularly, they show anti-inflammatory effects, as can be demonstrated in animal tests, for example, on rats. Furthermore, as can be shown, for instance, in animal tests, e.g. on guinea pigs, they display an antiallergic activity. The new compounds are, therefore, useful as anti-phlogistic agents. The new compounds are also valuable intermediates for the manufacture of other useful substances, especially of compounds having a pharmacological activity.

The lower alkyl-2-O-(β-carboxy-propionyl)-3,5,6-tri-O-benzyl-D-glucofuranosides and particularly the ethyl-2 - O - (β - carboxypropionyl)-3,5,6-tri-O-benzyl-D-glucofuranoside deserve special mention. The latter compound for example, in the form of its sodium salt, on intraperitoneal administration to the rat in a dose from about 0.1 to about 0.3 g./kg., produces a pronounced anti-inflammatory effect.

In contrast to similar 2-O-unsubstituted compounds, the salts of the new compounds, especially their alkali metal salts, are distinguished by their good solubility in water.

The new compounds are useful in free form or in the form of their salts, such as their metal salts or salts with organic bases, especially therapeutically acceptable, non-toxic salts, preferably the alkali metal salts, especially the sodium salts. Free acids and their salts can be converted one into the other in the usual manner. The salts may also be used for purifying the free acids. In view of the close relationship between the new compounds in free form and in form of their salts, whenever the free compounds or the salts are mentioned in this context, the corresponding salts and free compounds, respectively, are understood, provided such is feasible.

The new compounds may be in the form of pure anomers or as mixtures of anomers. The latter can be resolved into the two pure anomers on the basis of the physico-chemical differences of their constituents.

The new compounds are manufactured according to methods in themselves known. Preferably, a lower alkyl 3-O-$R_3$-5-O-$R_5$-6-O-$R_6$-glucofuranoside, in which the hydroxyl group in position 2 is unsubstituted, is reacted with an acylating agent capable of introducing the β-carboxyl-propionyl residue.

Sutable acylating agents are more especially succinic anhydride or reactive functional monoacid derivatives of succinic acid, such as a monohalide, especially the monochloride.

According to a preferred modification, the starting material is reacted with succinic acid anhydride in the presence of a condensing agent, such as an acidic or basic condensing agent, for example, pyridine. Alternatively, the glucofuranoside may be reacted with a succinic acid monohalide, in the presence of an acid-binding condensing agent, e.g. a tertiary base or sodium acetate.

The invention also includes any modification of the present process, in which an intermediate obtained at any stage of the process is used as starting material and any remaining step/steps is/are carried out or the process is discontinued at any stage thereof, or in which a starting material is formed under the reaction conditions or used in the form of a derivative, such as a salt, thereof.

The starting materials are known or, insofar as they are new, they can be prepared by known methods.

The new compounds or their salts may be used as medicaments, for example, in the form of pharmaceutical preparations containing them in conjunction or admixture with an organic or inorganic, solid or liquid pharmaceutical excipient suitable for enteral, parenteral or local administration. Suitable carrier materials are substances, which do not react with the new compounds, e.g. water, gelatin, lactose, starches, magnesium stearate, talcum, vegetable oils, benzyl alcohols, gums, polyalkyleneglycols or other known medicinal excipients. Pharmaceutical preparations may be, for example, tablets or dragees, or in liquid form as solutions, suspensions or emulsions. They may be sterilized and/or contain auxiliaries, such as preserving, stabilizing, wetting or emulsifying agents, salts for regulating the osmotic pressure or buffers. They may also contain other therapeutically valuable substances. The preparations are formulated by known methods.

The following examples illustrate the invention. Temperatures are given in degrees centigrade.

EXAMPLE 1

A solution of 28.8 g. of ethyl-3,5,6-tri-O-benzyl-D-glucofuranoside in 75 ml. of absolute pyridine is mixed with 6.6 g. of finely powdered succinic acid anhydride and heated for 24 hours at 70° while being stirred with exclusion of moisture, then evaporated at 55° under reduced pressure; the residue is mixed with 30 ml. of ice water, agitated for 45 minutes and then extracted with ether. The ether extract is washed five times with 50 ml. of ice-cooled 5 N hydrochloric acid and 50 ml. of ice water, dried over sodium sulfate, concentrated to 70 ml. and stirred with 50 ml. of saturated aqueous sodium bicarbonate solution and 50 ml. of water. The ether is then evaporated under reduced pressure in a rotary evaporator and the residue is diluted with 700 ml. of water and filtered through a layer of diatomaceous earth. The clear solution is adjusted to pH 2.5 with ice-cold 2 N hydrochloric acid and the precipitated oil is extracted with ether. The ether extracts are dried over sodium sulfate and evaporated under water-jet vacuum and then under high vacuum to furnish the ethyl - 2 - O - (β - carboxypropionyl) - 3,5,6 - tri - O - benzyl - D - gluco - furanoside of the formula

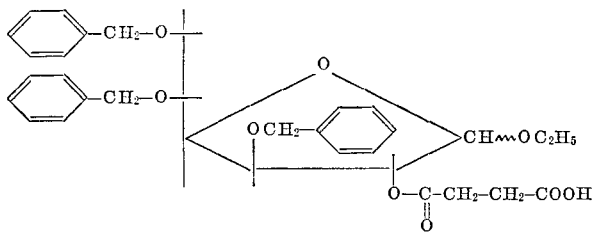

as a thickly liquid oil; $[\alpha]_D = -26°$ ($c=1$ in chloroform).

In order to prepare the sodium salt, the acid is dissolved in ether and stirred with the calculated amount of aqueous sodium hydrogen carbonate solution. The ether is evaporated under reduced pressure and the aqueous solution is filtered and lyophilized to yield the sodium salt as a thickly liquid oil.

In the thin-layer chromatogram on silicagel in the system n-butanol+acetic acid+water (150:15:42; parts by volume), stained with 50% ethanolic sulfuric acid, the substance reveals an Rf value of 0.68.

When a solution of the free compound in an excess of a 1 N aqueous-ethanolic sodium hydroxide is allowed to stand for a short time, the ester undergoes quantitative hydrolysis. The resulting ethyl - 3,5,6 - tri - O - benzyl - D-glucofuranoside is separated in the thin-layer chromatogram in the system chloroform+ethyl acetate (85:15) on silicagel (PF 254 of Messrs. Merck, Darmstadt), with sulfuric acid as indicator. The α-anomer reveals an Rf value of 0.56; $[\alpha]_D^{20} = +21°$ ($c=1$ in chloroform); and the β-anomer an Rf value of 0.27; $[\alpha]_D^{20} = -56°$ ($c=1$ in chloroform).

EXAMPLE 2

A solution of 10.12 g. of isobutyl - 3,5,6 - tri - O - benzyl - D - glucofuranoside in 40 ml. of absolute pyridine is mixed with 2.8 g. of finely powdered succinic acid anhydride, and while being stirred and under exclusion of moisture is heated for 38 hours at 70°. The bulk of pyridine is then distilled off at 60° under reduced pressure and the residue agitated with 40 ml. of ice water for 10 minutes. The water is decanted and the oil taken up in 150 ml. of ether; the ether solution is extracted five times with 50 ml. of ice-cooled 2 N hydrochloric acid and five times with 50 ml. of water. The ether solution is dried over sodium sulfate and evaporated under reduced pressure to yield the isobutyl - 2 - O - (β - carboxypropionyl) - 3,5,6 - tri - O - benzyl - D - glucofuranoside of the formula

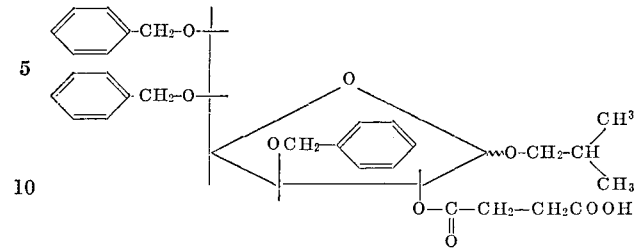

as a thickly liquid oil.

The sodium salt is prepared by dissolving the acid in ether, agitating the solution with the calculated amount of an aqueous sodium hydrogen carbonate solution, evaporating the ether under reduced pressure and then lyophilizing the aqueous solution, whereupon the sodium salt is obtained as a thickly liquid oil. From the sodium salt a clear aqueous solution of 3% strength can be prepared.

When a solution of the free compound in an excess of a 1 N aqueous-ethanolic sodium hydroxide solution is allowed to stand for a short time, the ester undergoes quantitative hydrolysis. The resulting isobutyl-3,5,6-tri-O-benzyl-D-glucofuranoside reveals in the thin-layer chromatogram on silicagel in the system chloroform plus ethyl acetate (85:15) an Rf value of 0.64 for the α-anomer and of 0.30 for the β-anomer.

The starting material may be prepared thus:

A solution of 250 g. of 1,2-O-isopropylidene-3,5,6-tri-O-benzyl-α-D-glucofuranose in 5000 ml. of a 1 N solution of dry hydrogen chloride in isobutanol is kept at room temperature for 24 hours. After cooling to 0–5°, the reaction mixture is neutralized with a 10 N aqueous sodium hydroxide solution, the bulk of isobutanol is distilled off at 50–60° under reduced pressure in a rotary evaporator, and the residue is extracted with chloroform. The chloroform solution is washed with water and dried over sodium sulfate, evaporated under reduced pressure and freed from residual solvent under a high vacuum. The resulting residue is subjected to a molecular distillation in a high vacuum to furnish the isobutyl-3,5,6-tri-O-benzyl-D-glucofuranoside as a thickly liquid oil, B.P. 240–245°/0.01 mm. Hg; $[\alpha]_D^{20} = -34° \pm 1°$ ($c=1$ in chloroform).

EXAMPLE 3

When 3.8 g. of ethyl-3,5,6-tri-O-benzyl-α-D-glucofuranoside in 25 ml. of pyridine are reacted with 0.87 g. of succinic acid anhydride by heating the mixture for 40 hours at 70° and working it up as described in Example 1, the ethyl-2-O-(β-carboxypropionyl)-3,5,6-tri-O-benzyl-α-D-glucofuranoside of the formula

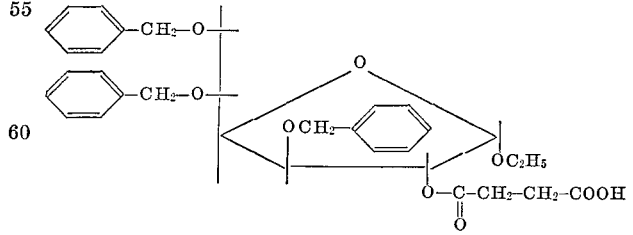

is obtained. From the sodium salt of this acid, a clear 10% aqueous solution can be prepared.

When a solution of the free compound in an excess of a 1 N aqueous-ethanolic sodium hydroxide solution is allowed to stand for a short time, the ester undergoes quantitative hydrolysis. The resulting ethyl-3,5,6-tri-O-benzyl-α-D-glucofuranoside shows in the thin-layer chromatogram on silicagel (PF 254, of Messrs. Merck, Darmstadt) in the system chloroform+ethyl acetate (85:15), indicator: sulfuric acid, an Rf value of 0.56; $[\alpha]_D^{20} = +21°$ ($c=1$ in chloroform).

EXAMPLE 4

When 9.6 g. of ethyl-3,5,6-tri-O-benzyl-β-D-glucofuranoside in 25 ml. of pyridine is treated with 2.2 g. of succinic acid anhydride, heated for 20 hours at 70° and worked up as described in Example 1, one obtains the ethyl - 2-O-(β-carboxypropionyl) - 3,5,6-tri-O-benzyl-β-D-glucofuranoside of the formula

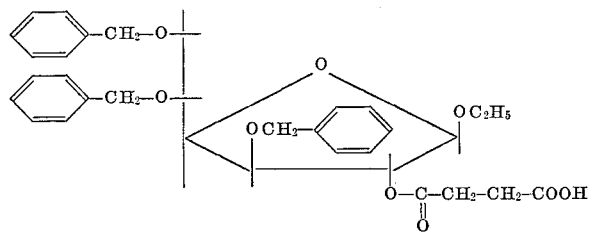

From the sodium salt of this acid a clear 10% aqueous solution can be prepared.

When a solution of the free compound in an excess of a 1 N aqueous-ethanolic sodium hydroxide solution is allowed to stand for a short time, the ester is quantitatively hydrolyzed. The resulting ethyl-3,5,6-tri-O-benzyl-β-D-glucofuranoside shows in the thin-layer chromatogram on silicagel (PF 254, of Messrs. Merck, Darmstadt) in the system chloroform+ethyl acetate (85.15), with sulfuric acid is indicator, and R$f$ value of 0.27; $[\alpha]_D^{20} = -56°$ ($c=1$ in chloroform).

EXAMPLE 5

A solution of 10 g. of n-propyl-3,5,6-tri-O-benzyl-D-glucofuranoside in 40 ml. of absolute pyridine is mixed with 2.24 g. of finely powdered succinic acid anhydride, then stirred and heated for 28 hours. The bulk of the pyridine is then distilled off at 55° under reduced pressure, and the residue is stirred for 45 minutes with 40 ml. of ice water. The water is decanted, the oil taken up in ether and agitated five times with ice-cold 2 N hydrochloric acid and water. The ether solution is dried over sodium sulfate, dried, filtered and evaporated at 40° under reduced pressure. The residue is extracted by being stirred with two portions of 50 ml. each of petroleum ether, the solvent is decanted and the oil is degassed under a high vacuum to yield the n-propyl-2-O-(β-carboxypropionyl)-3,5,6-tri-O-benzyl-D-glucofuranoside of the formula

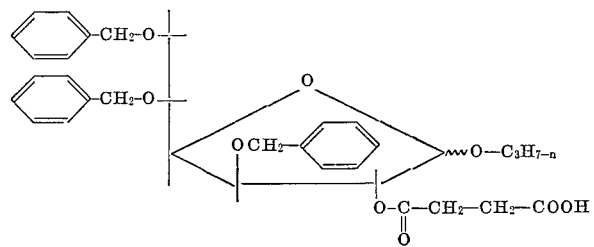

as a thick oil.

To prepare its sodium salt, the acid is dissolved in ether and agitated with the calculated amount of an aqueous sodium bicarbonate solution. The ether is evaporated under reduced pressure and the aqueous solution is lyophilized, whereupon the sodium salt is obtained as a thick oil. From the lyophilized product a clear aqueous solution of 6% strength can be prepared.

When a solution of the free compound in an excess of a 1 N aqueous-ethanolic sodium hydroxide solution is allowed to stand for a short time, the ester undergoes quantitative hydrolysis. The resulting n-propyl-3,5,6,-tri-O-benzyl-D-glucofuranoside is separated in the thin-layer chromatogram on silicagel (PF 254, of Messrs. Merck, Darmstadt) in the system chloroform+ethyl acetate (85:15), indicator: sulfuric acid. The α-anomer shows an R$f$ value of 0.57 and the β-anomer of 0.26.

EXAMPLE 6

A solution of 10 g. of n-butyl-3,5,6-tri-O-benzyl-D-glucofuranoside in 40 ml. of absolute pyridine is mixed with 2.2 g. of finely powdered succinic acid anhydride and heated at 70° for 75 hours while stirring and with the exclusion of moisture. The bulk of the pyridine is then distilled off at 50° under reduced pressure, the resulting residue is stirred for 10 minutes with 45 ml. of ice water, the aqueous layer is decanted and the oil taken up in 150 ml. of ether. The ether solution is washed five times with 50 ml. each of ice-cooled 5 N hydrochloric acid and 50 ml. of ice water, dried over sodium sulfate and evaporated under reduced pressure to yield as residue the n-butyl-2-O-(β-carboxypropionyl) - 3,5,6 - tri - O - benzyl-D-glucofuranoside of the formula

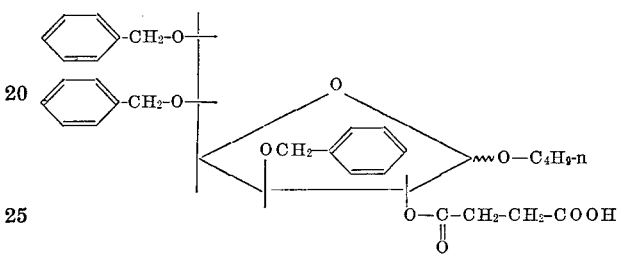

When a solution of the free compound in an excess of a 1 N aqueous-ethanolic sodium hydroxide solution is allowed to stand for a short time, the ester is quantitatively hydrolyzed. The resulting n-butyl-3,5,6-tri-O-benzyl-D-glucofuranoside is separated in the thin-layer chromatogram on silicagel (PF 254, of Messrs. Merck, Darmstadt) in the system chloroform+ethyl acetate (85:15), with sulfuric acid as indicator, and shows for the α-anomer an R$f$ value of 0.68; $[\alpha]_D^{20} = +20° \pm 1°$ ($c=1$ in chloroform); and for the β-anomer an R$f$-value of 0.31; $[\alpha]_D^{20} = -60° \pm 1°$ ($c=1$ in chloroform).

In the order to prepare the sodium salt of n-butyl-2-O-(β-carboxypropionyl) - 3,5,6-tri-O-benzyl-D-glucofuranoside, the acid is dissolved in ether and agitated with the calculated amount of an aqueous sodium bicarbonate solution. The ether is evaporated and the aqueous solution is lyophilized, whereupon the sodium salt results as a thick oil. From the lyophilizate a clear aqueous solution of 3.2% strength can be prepared.

The starting material can be prepared as follows:

A solution of 70 g. of 1,2-O-isopropylidene-3,5,6-tri-O-benzyl-α-D-glucofuranose in 1800 ml. of a normal solution of hydrochloric acid in n-butanol is kept for 22 hours at room temperature, then cooled to 0–5° and neutralized with a 10 N aqueous sodium hydroxide solution. The bulk of the n-butanol is distilled off under reduced pressure, the residue is extracted with chloroform, and the chloroform solution is washed with an aqueous sodium bisulfite solution and water, dried over sodium sulfate and evaporated under reduced pressure. The residue is freed at 40° under high vacuum from residual solvent; one thus obtains the n-butyl-3,5,6-tri-O-benzyl-D-glucofuranoside, which can be distilled in an apparatus for molecular distillation at 240–250°/0.01 mm. Hg; $[\alpha]_D^{20} = -36° \pm 1°$ ($c=1$ in chloroform).

I claim:

1. A member selected from the group consisting of glucofuranosides of the formula

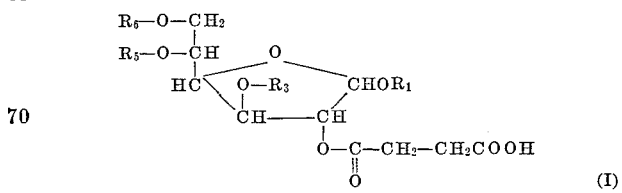

(I)

in which R$_1$ stands for lower alkyl, and each of R$_3$, R$_5$ and R$_6$ is a member selected from the group consisting of benzyl and benzyl substituted by a member selected from the group consisting of lower alkoxy, methylenedioxy, halogeno, lower alkyl and trifluoro-methyl, and alkali metal salts thereof.

2. A compound as claimed in claim 1 and being a member selected from the group consisting of lower alkyl - 2 - O - ($\beta$-carboxypropionyl)-3,5,6-tri-O-benzyl-D-glucofuranoside and alkali metal salts thereof.

3. A compound as claimed in claim 1 and being a member selected from the group consisting of ethyl-2-O-($\beta$-carboxypropionyl) - 3,5,6-tri-O-benzyl-D-glucofuranoside and alkali metal salts thereof.

4. A compound as claimed in claim 1 and being a member selected from the group consisting of the $\alpha$-anomer of ethyl-2-O-($\beta$-carboxypropionyl)-3,5,6-tri-O-benzyl-D-glucofuranoside and alkali metal salts thereof.

5. A compound as claimed in claim 1 and being a member selected from the group consisting of the $\beta$-anomer of ethyl-2-O-($\beta$-carboxypropionyl)-3,5,6-tri-O-benzyl-D-glucofuranoside and alkali metal salts thereof.

6. A compound as claimed in claim 1 and being a member selected from the group consisting of isobutyl-2 - O - ($\beta$ - carboxypropionyl) - 3,5,6 - tri-O - benzyl - D-glucofuranoside and alkali metal salts thereof.

7. A compound as claimed in claim 1 and being a member selected from the group consisting of n-propyl-2 - O - ($\beta$ - carboxypropionyl) - 3,5,6 - tri - O - benzyl D-glucofuranoside and alkali metal salts thereof.

8. A compound as claimed in claim 1 and being a member selected from the group consisting of n-butyl-2-O - ($\beta$ - carboxypropionyl) - 3,5,6 - tri - O - benzyl - D-glucofuranoside and alkali metal salts thereof.

References Cited

UNITED STATES PATENTS 3,157,634   11/1964   Druey et al. _____ 260—210

LEWIS GOTTS, Primary Examiner

J. R. BROWN, Assistant Examiner

U.S. Cl. X.R.

424—180